May 20, 1952     O. R. HUDDLESTON     2,597,330
FOLDING TRAY FOR AUTOMOBILE INSTRUMENT PANELS
Filed Sept. 22, 1950
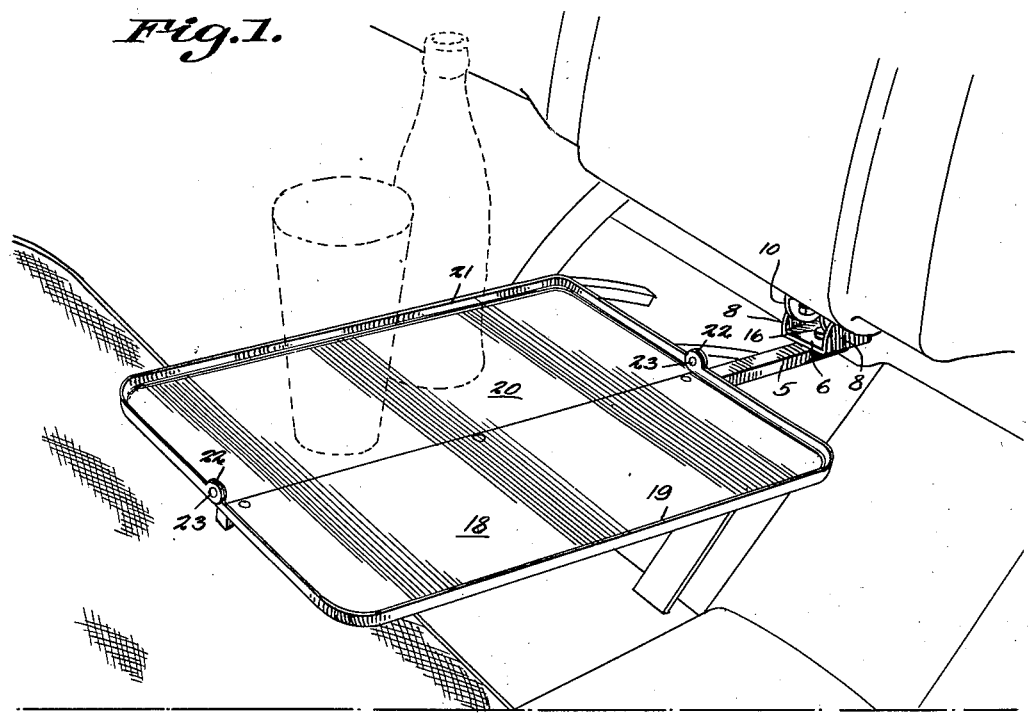
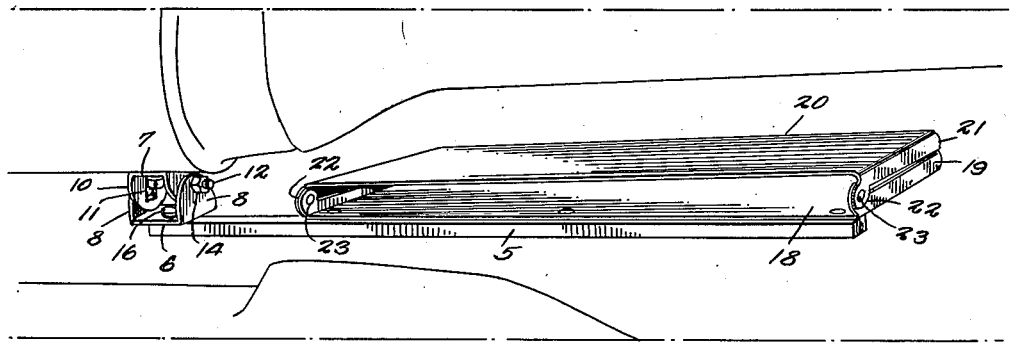
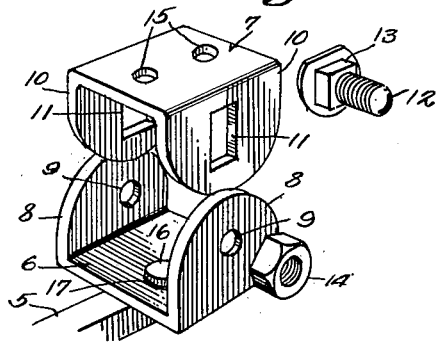
O. R. Huddleston
INVENTOR
BY *C. A. Snow & Co.*
ATTORNEYS Patented May 20, 1952

2,597,330

UNITED STATES PATENT OFFICE 2,597,330

FOLDING TRAY FOR AUTOMOBILE INSTRUMENT PANELS

Owen R. Huddleston, Miami, Okla.

Application September 22, 1950, Serial No. 186,261

1 Claim. (Cl. 311—21)

This invention relates to serving trays, and more particularly to serving trays designed for use in connection with motor vehicles, the primary object of the invention being to provide a serving tray which when out of use, may be folded into a small and compact article and swung to a position out of the way under the instrument board of the vehicle.

An object of the invention is to provide a tray of this character including an adjustable bracket so constructed and arranged that it may be adjusted to adapt the device for use on motor vehicle instrument boards of various sizes and designs.

Still another object of the invention is to provide a device of this character which will be readily movable from its concealed position under the instrument board, to its extended position for use, means being provided for yieldably holding the tray in either its extended or retracted position.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a perspective view illustrating a tray constructed in accordance with the invention as extended to its supporting position.

Fig. 2 is a perspective view illustrating the tray as folded and swung to its concealed position under the instrument board.

Fig. 3 is an exploded view illustrating the adjustable bracket by means of which the tray is supported.

Referring to the drawing in detail, the tray embodies a supporting arm 5, which is pivotally mounted on the bracket which secures the tray in position under the instrument board of a motor vehicle, the bracket comprising substantially U-shaped members 6 and 7, the member 6 being provided with upstanding ears 8, spaced apart and provided with openings 9.

The U-shaped member 7 of the bracket is also provided with ears 10, the ears 10 of the member 7 being fitted between the ears 8 of the member 6. As clearly shown by Fig. 3 of the drawing, the ears 10 of the member 7 are formed with rectangular elongated openings 11 in which bolts such as indicated at 12, are positioned, the bolts 12 having rectangular enlargements 13 that fit in these openings to prevent the bolts from turning within the openings, but permit the bolts to be adjusted vertically to provide for a clearance in positioning the bracket under an instrument board.

The nuts 14 are positioned on the bolts 12 and when tightened operate to secure the U-shaped members 6 and 7 in their adjusted positions with respect to each other.

Openings 15 are formed in the main portion of the member 7 and accommodate securing screws or bolts which are used in securing the member 7 to the lower surface of the instrument board.

The supporting arm 5 is secured to the U-shaped member 6 of the bracket, by means of the rivet 16, there being provided the tension washer 17 disposed between the rivet head and member 6, the tension washer providing sufficient friction between the rivet head and member 6, to control the pivotal movement of the supporting arm and at the same time hold the tray and its supporting arm against vibrations.

The tray proper includes the stationary section 18 which is formed with an upstanding marginal flange 19, and the section 20 formed with the marginal flange 21, the flanges 19 and 21 being provided with enlargements 22 which are apertured to receive the rivets 23 that provide pivots for the sections to permit the sections 20 to be folded over the section 18 when the tray is swung to a position out of use, or permit the section 20 to be swung outwardly to its extended position, as shown by Fig. 1, to support articles, permitting the tray to operate as a table.

From the foregoing it will be seen that due to the construction shown and described, I have provided a folding and pivoted tray which may be readily and easily mounted on a vehicle directly under the instrument board, which may be swung into and out of operation at the will of the operator.

Having thus described the invention, what is claimed is:

In a folding tray, a supporting arm, a bracket to which one end of said supporting arm is pivotally connected mounted under the instrument board of a motor vehicle, a stationary tray section rigidly secured to the arm adjacent to one longitudinal edge thereof, a tray section pivotally connected to the stationary section for vertical swinging movement over the stationary section, or to a horizontal supporting position in horizontal alignment with the stationary section, one edge of the pivoted tray section resting on said supporting arm when in its unfolded position, and said arm and tray adapted to swing to a concealed position under the instrument board.

OWEN R. HUDDLESTON.

REFERENCES CITED

The following references are of record in the file of this patent:

UNITED STATES PATENTS

| Number | Name | Date |
|---|---|---|
| 1,801,637 | Nichols | Apr. 21, 1931 |
| 1,891,834 | Pendleton | Dec. 20, 1932 |
| 1,900,325 | Bayman et al. | Mar. 7, 1933 |
| 2,080,261 | Funk | May 11, 1937 |
| 2,270,557 | Randall | Jan. 20, 1942 |
| 2,270,948 | Howe | Jan. 27, 1942 |
| 2,510,436 | Trammell | June 6, 1950 |
| 2,526,322 | Black | Oct. 17, 1950 |